United States Patent [19]

Baer

[11] 4,281,079

[45] Jul. 28, 1981

[54] POLYARYLENE ESTER COMPOSITIONS

[75] Inventor: Massimo Baer, Longmeadow, Mass.

[73] Assignee: Monsanto Company, St. Louis, Mo.

[21] Appl. No.: 968,524

[22] Filed: Dec. 11, 1978

[51] Int. Cl.$^3$ .................... B28B 3/20; C08L 23/00
[52] U.S. Cl. ........................ 525/152; 264/141; 264/143; 264/176 R; 264/349; 525/132; 525/167; 525/171; 525/177
[58] Field of Search .............. 260/873; 264/141, 143, 264/349, 176 R; 525/132, 167, 171, 177, 152

[56] References Cited

U.S. PATENT DOCUMENTS

| | | | |
|---|---|---|---|
| 3,647,921 | 3/1972 | Berry | 260/873 |
| 3,671,478 | 6/1972 | Doyle et al. | 260/873 |
| 3,674,724 | 7/1972 | Mirzocchi | 260/873 |
| 3,792,118 | 2/1974 | Kishikawa et al. | 260/873 |
| 3,839,499 | 10/1974 | Jadamus | 260/873 |

FOREIGN PATENT DOCUMENTS

| | | | |
|---|---|---|---|
| 48-25053 | 2/1973 | Japan | 260/873 |
| 51-22753 | 2/1976 | Japan | 260/873 |

*Primary Examiner*—J. Ziegler
*Attorney, Agent, or Firm*—R. Bruce Blance; William J. Farrington; Edward P. Grattan

[57] ABSTRACT

Polyarylene ester compositions comprising an intimate admixture of polyarylene ester and up to about 10 weight percent of an elastomeric ethylene 1-alkene copolymer. The compositions possess greatly improved impact resistance and reduced notch sensitivity in comparison with the polyarylene ester and exhibit improved melt flow with minimal loss in flame retardance, heat distortion resistance and tensile properties. The compositions are useful as molding powders and sheet extrusion compounds.

18 Claims, No Drawings

POLYARYLENE ESTER COMPOSITIONS

This invention relates to polyarylene esters of improved impact resistance, to a process of preparing such polyesters, and to molding powders and molded articles of such polyesters. More particularly, this invention is concerned with thermoplastic polyarylene esters in which impact strength is improved by addition of a minor amount of elastomeric ethylene copolymer, with a process of preparation of such impact resistant polyarylene esters and with molding powders and extruded and molded articles of such polyarylene esters.

Substantially linear wholly aromatic polyarylene esters are well known in the prior art and are described in U.S. Pat. No. 3,216,967. These polyarylene esters are high performance, engineering thermoplastics having many desirable physical and chemical properties which allow them to be used in relatively high temperature environments. In general they are somewhat deficient in melt flow behavior because of their high melt viscosity and exhibit rather poor impact strength and excessive notch sensitivity. These deficiencies have been overcome by blending the polyarylene esters with substantial amounts of various vinyl addition polymers but other properties of the polyarylene esters such as flame resistance, heat distortion resistance and tensile strength are adversely affected.

In the present invention, polyarylene esters are intimately blended with a minor amount of an elastomeric ethylene 1-alkene copolymer to provide compositions possessing greatly improved impact resistance. There is also an improvement in melt flow properties and a minimal loss in flame resistance, heat distortion resistance and tensile properties.

The compositions of the invention comprise the polyarylene ester in intimate admixture with up to about 10% by weight of an elastomeric ethylene 1-alkene copolymer which is present in an amount sufficient to provide improved impact strength in comparison with the polyarylene ester without the elastomeric copolymer. Other aspects of the invention are directed to molding powders and molded articles comprising the polyblend composition and to the process of preparing the polyblend by melting the polyarylene ester and blending the melt with an excess of the elastomeric copolymer to form an elastomer concentrate, extruding the concentrate in the form of sheets or strands, cooling the sheets or strands to a temperature below the glass transition temperature of the polyarylene ester, comminuting the sheets or strands, and melt blending the comminuted concentrate with polyarylene ester to obtain the polyblend composition of the invention containing up to about 10% by weight of the elastomeric copolymer.

The polyarylene ester is the substantially linear condensation product of a $C_8$ to $C_{25}$ aromatic dicarboxylic acid and a $C_6$ to $C_{25}$ diphenol. The component acid and phenol units are selected so that the polyarylene ester forms a melt at a temperature below about 350° C.

While essentially any suitable $C_8$ to $C_{25}$ aromatic dicarboxylic acid and admixture thereof can be used in the preparation of the polyarylene esters, the preferred aromatic dicarboxylic acids comprise at least one acid selected from the group consisting of isophthalic acid, terephthalic acid, t-butylisophthalic acid, 3,3′-, 3,4′- and 4,4′-bibenzoic acids, 1,5-, 2,6-, and 2,7-naphthalic acid, bis(4-carboxyphenyl)ether, bis(4-carboxyphenyl)sulfide, bis(4-carboxyphenyl)sulfone, bis(4-carboxyphenyl)methane, 1,1-bis(4-carboxyphenyl)ethane, 1,2-bis(4-carboxyphenyl)ethane, and 2,2-bis(4-carboxyphenyl)propane. Preferred aromatic dicarboxylic acids include isophthalic and terephthalic acids and mixtures thereof. Mixtures of one or more of the aromatic dicarboxylic diacids with minor quantities, generally less than about 25 mol percent, of $C_2$ to $C_{20}$ aliphatic diacids can also be used. The quantities of aliphatic diacids in general are selected so that they do not cause a significant loss in Tg of the resulting polyesters. Preferably the quantity is limited to a loss in Tg of not more than 10° C. Also minor amounts, up to about 25 mol percent of 4-hydroxybenzoic acid can be introduced into the polyarylene ester.

The acid or admixture of acids is combined with essentially any suitable diphenol or mixture of diphenols to provide the polyarylene esters. The preferred diphenols comprise at least one diphenol selected from the group consisting of resorcinol, hydroquinone, 3,3′-, 3,4′- and 4,4′-diphenols, and diphenols represented by the formula:

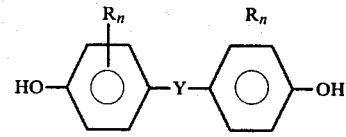

wherein Y is O, , $SO_2$, CO, $C_1$ to $C_3$ alkylene or $C_2$ to $C_{13}$ alkylidene, and R is H, a $C_1$ to $C_4$ alkyl radical, Cl or Br and n=0 to 4. The preferred diphenols include bis(4-hydroxyphenyl)methane, 1,1-bis(4-hydroxyphenyl)ethane, 1,2-bis(4-hydroxyphenyl)ethane, 2,2-bis(4-hydroxyphenyl)propane, bis(4-hydroxyphenyl)ether, bis(4-hydroxyphenyl)sulfide and bis(4-hydroxyphenyl)sulfone. Of these, 2,2-bis(4-hydroxyphenyl)propane is most preferred.

The weight average molecular weight of the polyarylene ester for adequate performance as an engineering thermoplastic is preferably at least about 20,000 and more preferably at least about 25,000.

The polyarylene ester component of the present invention can be produced by any convenient method such as by melt condensation or solvent condensation of aromatic dicarboxylic acids and diphenols or diphenol diesters. It can be produced by melt or solution polymerization of selected mixtures of phenol esters of aromatic dicarboxylic acids and diphenols and by interfacial polymerization of salts of diphenols and aromatic dicarboxylic acid dihalides. Thus, while the combination is formally a condensate of diacid and diphenol, in practice the reactants can be diacids and diphenol esters, or phenyl esters of diacids and diphenols, or salts of diphenols and diacid halides. A preferred method of preparation is the melt condensation of mixtures of aromatic dicarboxylic acid and diphenol diesters. Another preferred method is the melt condensation of mixtures of aromatic dicarboxylic acids and diphenol diesters to a prepolymer stage followed by solid state polymerization to advance the polymer to at least the minimum molecular weight.

The elastomeric ethylene 1-alkene copolymer which is the second component of the compositions of the present invention is a copolymer of ethylene and propylene or 1-butene containing about 30 to 70% by weight ethylene and about 70 to 30% by weight propylene or 1-butene. The co-monomer is preferably propylene. The copolymers can be produced by conventional methods using coordinate polymerization catalysts such as those of the Ziegler-Natta type. The monomers are randomly distributed in the copolymers and there is little block structure since the degree of crystallinity is ordinarily in the range of about 0 to 3%. The melt index is generally in the range of about 0.1 to about 10 g/10 min.

Optionally, the ethylene copolymer may include a diolefin monomer which introduces unsaturated side groups. Preferred diolefins are $C_5$ to $C_{10}$ nonconjugated dienes containing isolated double bonds and include 1,4-pentadiene, 2-methyl-1,4-pentadiene, 1,4-hexadiene, 1,5-hexadiene, 2-methyl-1,5-hexadiene, dicyclopentadiene, norbornadiene, methylenenorbornene, and 1,5-cyclooctadiene. In general, the third monomer is present in the copolymer as a minor component usually less than about 10% by weight and more preferably less than about 5% by weight, and is randomly distributed throughout the copolymer.

The amount of elastomeric ethylene copolymer added to the polyarylene ester is sufficient to provide improved impact strength in comparison with the polyarylene ester composition without the elastomeric copolymer and is generally up to about 10% by weight of the polyarylene ester polyblend. More preferably, the amount is in the range of about 1 to about 5 weight % of the polyblend to provide sufficient improvement in impact strength without causing a decrease in other physical properties of the polyarylene ester. When the amount is greater than about 5 weight %, the polyblend exhibits a tendency towards excessive incompatibility which increases with increasing content of the elastomeric copolymer and can affect the physical properties of the polyblend adversely.

In the preparation of the polyblends of the present invention, the components in comminuted form are preferably predried at temperatures and pressures such as to obtain maximum drying while avoiding agglomeration. They may then be blended by metering individual streams of the components into a single or twin screw extruder which serves to melt and mix the components. The blend, thus mixed and melted, may then be extruded by known methods. Alternatively, the components may be mixed by melt blending in a batch or continuous mixer to form a concentrate of the elastomeric copolymer in the polyarylene ester. The melt concentrate is extruded in the form of sheets or strands which are then cooled below the glass transition temperature of the polyarylene ester and comminuted to a size suitable for efficient blending with further polyarylene ester to obtain a polyblend containing the desired amount of elastomeric copolymer. The final blend may also be carried out by melt blending in a batch or continuous mixer and can be injection molded or extruded in sheet or strand form and comminuted to provide the molding powders of the present invention. The concentrate of elastomer in the polyarylene ester is conveniently in the range of from about 15 to about 50% by weight and to provide the compositions of the present invention, it is blended with further polyarylene ester to reduce the concentration to less than about 10 weight % and more preferably to the range of about 1 to about 5 weight %.

The compositions of the present invention may include in intimate admixture any of the additives conventionally used with molding resins such as colorants, plasticizers, stabilizers, flame retardants, reinforcing agents, and the like, which are incorporated in a effective amount to achieve the desired purpose of the additive.

The molding resins of the present invention can be molded in any equipment conveniently used for reinforced thermoplastic compositions e.g., an Arburg machine with temperature in the range of about 250° to about 350° C. and mold temperatures about 100° to 150° C. can be used. Depending on the molding properties of the polyarylene ester polyblend, the amount of additives and the crystallization behavior of the polyarylene ester, those skilled in the art will be able to make the conventional adjustments in molding cycles to accommodate the composition.

The invention is further illustrated but is not intended to be limited by the following examples in which parts and percentages are by weight unless specified otherwise.

EXAMPLE 1

A polyarylene condensate of 2,2-bis(4-hydroxyphenyl)propane and isophthalic acid containing 3 mole percent azelaic acid, of inherent viscosity 0.71 dl/g determined at a concentration of 0.5 g/dl in a solvent pair of phenol and sym-tetrachloroethane in a weight ratio of 60:40, is blended with an ethylene-propylene copolymer sold by E. I. duPont de Nemours and Company, under the registered tradename Nordel 1470. The weight ratio of polyarylene ester to ethylene-propylene copolymer is 3:1. The blending is carried out in a Brabender mixer at 40 rpm. The bowl temperature is 575° F. (302° C.), and the stock temperature rises to 600° F. (316° C.). A torque of 1600 m.g is generated. The blend concentrate is discharged from the mixer, cooled to room temperature and cut into small pieces. It is then ground through a Thomas mill.

The ground blend concentrate is mixed with pellets of the polyarylene ester in the weight ratio of 1:24 in the Brabender mixer at a temperature of 575° F. (302° C.) and a torque of 4000–5000 m.g at 30 rpm to provide a polyblend containing 1 weight % ethylene-propylene copolymer. The melt is discharged from the mixer as a strand with a slightly rough surface. The strand is pelletized and the resulting molding powder is molded on a ½ oz. (227 g.) Arburg molding machine to provide test bars. The tensile strength is 9252 psi (64 MPa) at yield, and 8163 psi (56 MPa) at fail. The elongation is 6.5% at yield and 47% at fail. The tensile modulus is $2.7 \times 10^5$ psi ($18.6 \times 10^2$ MPa) and the Izod notched impact strength obtained with a notch radius of 0.01 inch is 3.7 ft.lb./in. (201 J/m notch). The Vicat softening point is 187° C.

EXAMPLES 2–4

Similar polyblends are prepared containing 3% Nordel 1479, and 1% and 3% Nordel 1560, respectively. The data for tensile strength and elongation at yield, tensile modulus, impact strength and Vicat softening point are presented in Table 1 in comparison with data for the polyarylene ester containing no ethylene-propylene copolymer. The following test methods are used:
  Tensile strength, elongation and modulus (ASTM-D-638-76)
  Izod impact strength (ASTM-D-256-73), test bars width—3.17 mm
  Vicat softening temperature
  Heat distortion temperature under load (ASTM-D-648-72)

TABLE 1
COMPARISON OF POLYBLENDS CONTAINING THE POLYISOPHTHALATE OF 2,2-BIS(4-HYDROXYPHENYL)PROPANE

| | Example | | | | |
|---|---|---|---|---|---|
| | 1 | 2 | 3 | 4 | 5 |
| Ethylene-Propylene Copolymer | Nordel 1470 | Nordel 1470 | Nordel 1560 | Nordel 1560 | — |
| Weight % | 1 | 3 | 1 | 3 | 0 |
| Polyblend Properties | | | | | |
| Tensile Strength MPa | 64 | 62 | 64 | 59 | 64 |
| Elongation % | 6.5 | 6.5 | 7.1 | 6.8 | 6.7 |
| Tensile Modulus MPa × $10^{-2}$ | 18.6 | 19.3 | 18.6 | 18.6 | 19.3 |
| Izod J/m notch | 201 | 277 | 201 | 244 | 136 |
| Vicat °C. | 187 | 187 | 187 | 187 | 187 |

EXAMPLES 6-9

A series of polyblends containing increasing quantities of ethylene propylene copolymer is prepared from the polyarylene ester of Example 1 and Nordel 1070, an ethylene-propylene copolymer of high Mooney viscosity containing 53.6 weight % ethylene, 43.7 weight % propylene and 2.5 weight % diene, by directly blending the ethylene-propylene copolymer cut into ⅛ inch (3.2 mm) cubes with pellets of the polyarylene ester and melt mixing the blend in a Brabender extruder operated at 40 rpm, and a barrel temperature of 320° C. The torque generated is 2500 m.g. Example 6 is prepared by a single pass extrusion. Examples 7-9 are obtained by two-pass extrusion. Data for the physical properties of the polyblends are presented in Table 2. Surface delamination of the polyblend containing 10% ethylene-propylene copolymer occurred during tensile testing, indicating excessive incompatibility at this concentration. Impact strength is higher for the polyblend containing 5% ethylene-propylene copolymer in comparison with the 3 and 10% polyblends. The two-pass extrusion method increases impact strength more than the one-pass method. There is a steady loss in tensile properties and heat distortion resistance with increase in the copolymer content.

TABLE 2
POLYBLENDS OF POLYARYLENE ESTER CONTAINING INCREASING AMOUNTS OF EP COPOLYMER

| | Example | | | | |
|---|---|---|---|---|---|
| | 5 | 6 | 7 | 8 | 9 |
| EP Copolymer | — | Nordel 1070 | Nordel 1070 | Nordel 1070 | Nordel 1070 |
| Weight % | 0 | 3 | 3 | 5 | 10 |
| Polyblend Properties | | | | | |
| Tensile Strength MPa | 70 | 66 | 63 | 60 | 55 |
| Tensile Modulus MPa × $10^{-2}$ | 25 | 21 | 21 | 20 | 19 |
| Izod J/m notch | 146 | 255 | 331 | 412 | 380 |
| HDTUL °C. | 163 | — | 151 | 146 | 146 |

EXAMPLES 10-12

A series of polyblends of the polyarylene ester of Example 1 containing 3 weight % of various ethylene vinyl acetate copolymers was prepared via the polymer concentrate method set forth in Example 1. The data for the polyblends are set forth in Table 3. They show that while the melt viscosity of the polyarylene ester is significantly reduced by the introduction of a minor amount of ethylene vinyl acetate copolymer, the marked improvement in impact strength achieved with the ethylene-propylene copolymer is not obtained. The reduction in melt viscosity with the ethylene vinyl acetate copolymers is partly due to degradation of the polyarylene ester. No degradation of polyarylene ester is observed with ethylene-propylene copolymer.

TABLE 3
POLYBLENDS OF POLYARYLENE ESTER AND ETHYLENE COPOLYMER

| | | | | Polyblend Properties | |
|---|---|---|---|---|---|
| Example | Polymer | Strand Appearance | Brabender Torque m.g at 30 rpm | Tensile Modulus MPa × $10^{-2}$ | Izod, J/m notch |
| 2 | Nordel 1070 | sl.rough | 2500 | 19 | 277 |
| 5 | — | smooth | 6000 | 19 | 136 |
| 10 | ethylene vinyl acetate copolymer (18% VA) | rough, unfused, particles | 2000 | 17 | 200 |
| 11 | ethylene vinyl acetate copolymer (28% VA) | sl.rough | 2000 | 19 | 173 |
| 12 | ethylene vinyl acetate copolymer (18% VA) | Smooth | 1500 | 20 | 179 |

EXAMPLES 13-18

A series of polyblends is prepared from the polyarylene ester of Example 1 of inherent viscosity 0.63 dl/g, and several elastomeric copolymers. The polyblends are prepared by the method of Example 6 and contain 3 weight % of copolymer. The Brabender extruder is operated at 50 rpm and 295° C. The data for the polyblends are presented in Table 4.

The data again show the marked improvement in impact strength obtained with the ethylene-propylene copolymer in comparison with the other elastomers which are found to adversely affect the tensile modulus, the melt viscosity and/or the impact strength of the polyarylene ester.

TABLE 4
POLYBLENDS OF POLYARYLENE ESTER OF 2,2-BIS(4-HYDROXYPHENYL)PROPANE

| | | | Polyblend Properties | |
|---|---|---|---|---|
| Example | Copolymer | Brabender Torque m/g | Tensile Modulus MPa × $10^{-2}$ | Izod J/m notch |
| 13 | — | 3000 | 19 | 167 |
| 14 | Nordel 1070 | 3000 | 19 | 412 |
| 15 | Polyether urethane | 3000 | 20 | 141 |
| 16 | Polybutadiene | 5500 | 18 | 66 |
| 17 | Polybutadiene, SAN graft | 4000 | 16 | 163 |
| 18 | Polyethylene/ acrylate | 3000 | 17 | 241 |

EXAMPLES 19-20

A polyblend is prepared by the method of Example 6 from a polyarylene ester condensate of isophthalic acid and 1,2-bis(4-hydroxyphenyl)ethane of inherent viscosity 0.70 dl/g and 3 weight % of ethylene propylene copolymer. The Brabender extruder is operated at 40 rpm and 300° C. The torque generated at the second pass is about 2000 m.g. The extruded polyblend strand is rough and lumpy. The polyblend is molded on an Arburg 100 Molding Machine at 310° C. and 6.89 MPa pressure with the screw operating at 350 rpm and generating a back pressure of 1.38 MPa. Data for the molded polyblend (Example 19) are compared with data for the polyarylene ester (Example 20) in Table 5 and show the marked improvement in impact strength obtained with the polyblend.

TABLE 7
POLYBLENDS WITH A SERIES OF ETHYLENE PROPYLENE COPOLYMERS

| | Copolymer Composition, wt. % | | | Copolymer Mooney | Izod Impact | Tensile Modulus | Melt Viscosity kPa . s | |
|---|---|---|---|---|---|---|---|---|
| Example | Ethylene | Propylene | Diene | Viscosity | J/m | MPa | 100 sec[1] | 1000 sec[1] |
| 23 | 45 | 55 | — | 38–50 | 439 | 22 | 1.79 | 0.61 |
| 24 | 53.9 | 42.3 | 3.8 | 55 | 461 | 22 | 2.02 | 0.74 |
| 25 | 65.4 | 30.8 | 3.8 | 52–67 | 477 | 19 | 2.01 | 0.74 |
| 26 | 48.8 | 46.9 | 4.3 | 51 | 472 | 19 | 2.00 | 0.72 |
| 27 | 52.4 | 39.6 | 8 | 62–75 | 466 | 20 | 2.18 | 0.78 |
| 14 | 53.6 | 43.9 | 2.5 | — | 434 | 19 | 2.80 | 0.82 |
| 13 | — | — | — | — | 174 | 19 | 3.80 | 1.12 |

TABLE 5
ETHYLENE PROPYLENE COPOLYMER POLYBLEND WITH POLYISOPHTHALATE OF 1,2-BIS(4-HYDROXYPHENYL)ETHANE

| Example | Tensile Strength (yield), MPa | Tensile Strength (fail), MPa | Elongation (fail) % | Izod Impact J/m notch |
|---|---|---|---|---|
| 19 | 59 | 60 | 12 | 206 |
| 20 | 66 | 69 | 14 | 114 |

EXAMPLES 21–22

The polyarylene ester of Example 13 and the polyblend of Example 14 containing 3 weight % of ethylene-propylene copolymer are subjected to the Izod impact test using test pieces with notch radius decreased from 0.01 inch (0.25 mm) to 0.0025 inch (0.064 mm). The polyblend demonstrates less notch sensitivity since its impact strength decreases by 35% while the impact strength of the polyarylene ester decreases by 74%.

TABLE 6
NOTCH SENSITIVITY OF POLYESTER AND POLYBLENDED POLYESTER

| Example | Notch Radius mm | Izod Impact J/m notch | % Decrease |
|---|---|---|---|
| 13 | 0.25 | 167 | — |
| 21 | 0.064 | 44 | 74 |
| 14 | 0.25 | 412 | — |
| 22 | 0.064 | 267 | 35 |

EXAMPLES 23–27

Polyblends are prepared by the method of Example 6 from the polyarylene ester of Example 13 and a series of ethylene propylene copolymers of different composition. The concentration of copolymer in the polyblend is 3 weight %. The Brabender extruder is operated at 40 rpm and a barrel temperature of approximately 285° C. The extruded polyblends are injection molded on an Arburg 100 Molding Machine with the temperature screw setting and speed adjusted for an injection molding time of 2 secs. Data for the polyblends are presented in Table 7 and include Examples 13 and 14 for comparison. The data demonstrate the significant decrease in melt viscosity obtained by introducing the ethylene propylene copolymer and the marked improvement in impact strength without an adverse effect on the tensile strength.

What is claimed is:

1. A composition having improved impact strength comprising in intimate admixture a polyarylene ester and up to about 10% by weight of an elastomer consisting essentially of ethylene 1-alkene copolymer present in an amount sufficient to provide improved impact strength in comparison with the polyarylene ester composition without the elastomeric copolymer, wherein the polyarylene ester forms a melt at a temperature below about 350° C. and is the condensation product of a $C_8$ to $C_{25}$ aromatic dicarboxylic acid and a $C_6$ to $C_{25}$ diphenol and wherein the 1-alkene is selected from the group consisting of propylene and 1-butene.

2. The composition of claim 1 wherein the aromatic dicarboxylic acid is selected from the group consisting of isophthalic acid, terephthalic acid, t-butylisophthalic acid, 3,3'-, 3,4'- and 4,4'-bibenzoic acids, 1,5-, 2,6- and 2,7-naphthalic acids, bis(4-carboxyphenyl)methane, 1,1-bis(4-carboxyphenyl)ethane, 1,2-bis(4-carboxyphenyl)ethane, 2,2-bis(4-carboxyphenyl)propane, bis(4-carboxyphenyl)ether, bis(4-carboxyphenyl)sulfide and bis(4-carboxyphenyl)sulfone and the diphenol is selected from the group consisting of hydroquinone, resorcinol, 3,3'-, 3,4'- and 4,4'-diphenols and diphenols represented by the formula

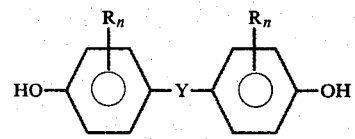

wherein Y is O, S, $SO_2$, CO, $C_1$ to $C_3$ alkylene, $C_2$ to $C_{13}$ alkylidene and R is H, $C_1$ to $C_4$ alkyl, Cl or Br and n=0 to 4.

3. The composition of claim 1 wherein the aromatic dicarboxylic acid is selected from the group consisting of isophthalic and terephthalic acids and the diphenol is selected from the group consisting of bis(4-hydroxyphenyl)methane, 1,1-bis(4-hydroxyphenyl)ethane, 1,2-bis(4-hydroxyphenyl)ethane, 2,2-bis(4-hydroxyphenyl)propane, bis(4-hydroxyphenyl)ether, bis(4-hydroxyphenyl)sulfide and bis(4-hydroxyphenyl)sulfone.

4. The composition of claim 1 wherein the aromatic dicarboxylic acid is selected from the group consisting of isophthalic and terephthalic acids and the diphenol is 2,2-bis(4-hydroxyphenyl)propane.

5. The composition of claim 1, 2, 3 or 4 wherein the 1-alkene is propylene.

6. The composition of claim 5 wherein the ethylene propylene elastomer is modified with up to 10 weight percent of a non-conjugated $C_5$ to $C_{10}$ aliphatic diene.

7. The composition of claim 5 wherein the ethylene propylene elastomer is present in a concentration range of from about 1 to about 5 weight percent.

8. A molding powder comprising the composition of claim 1, 2, 3 or 4.

9. A molding powder comprising the composition of claim 5.

10. A molding powder comprising the composition of claim 6.

11. A molding powder comprising the composition of claim 7.

12. A molded article comprising the composition of claim 1, 2, 3 or 4.

13. A molded article comprising the composition of claim 5.

14. A molded article comprising the composition of claim 6.

15. A molded article comprising the composition of claim 7.

16. A process for preparing a polyblend having improved impact strength comprising a polyarylene ester and up to about 10% by weight of an elastomer consisting essentially of ethylene 1-alkene copolymer, which comprises melting the polyarylene ester and blending the melt with an excess of the elastomeric copolymer to form an elastomer concentrate, extruding the elastomer concentrate melt in the form of sheets or strands, cooling the elastomer concentrate extrudate to a temperature below the glass transition temperature of the polyarylene ester, comminuting the elastomer concentrate extrudate and melt blending the comminuted elastomer concentrate with polyarylene ester to obtain the polyblend containing up to about 10% by weight of the elastomeric copolymer.

17. The process of claim 16 wherein the polyarylene ester forms a melt at a temperature below about 350° C. and is the condensation product of a $C_8$ to $C_{25}$ aromatic dicarboxylic acid and a $C_6$ to $C_{25}$ diphenol and wherein the elastomeric ethylene copolymer is a copolymer of propylene or 1-butene.

18. The process of claim 16 wherein the elastomer concentrate comprises from about 15 to about 50 percent by weight of the elastomer copolymer.

* * * * *